July 6, 1954
A. W. ORR, JR
2,682,836
FUEL PUMP
Filed April 20, 1950
3 Sheets-Sheet 1
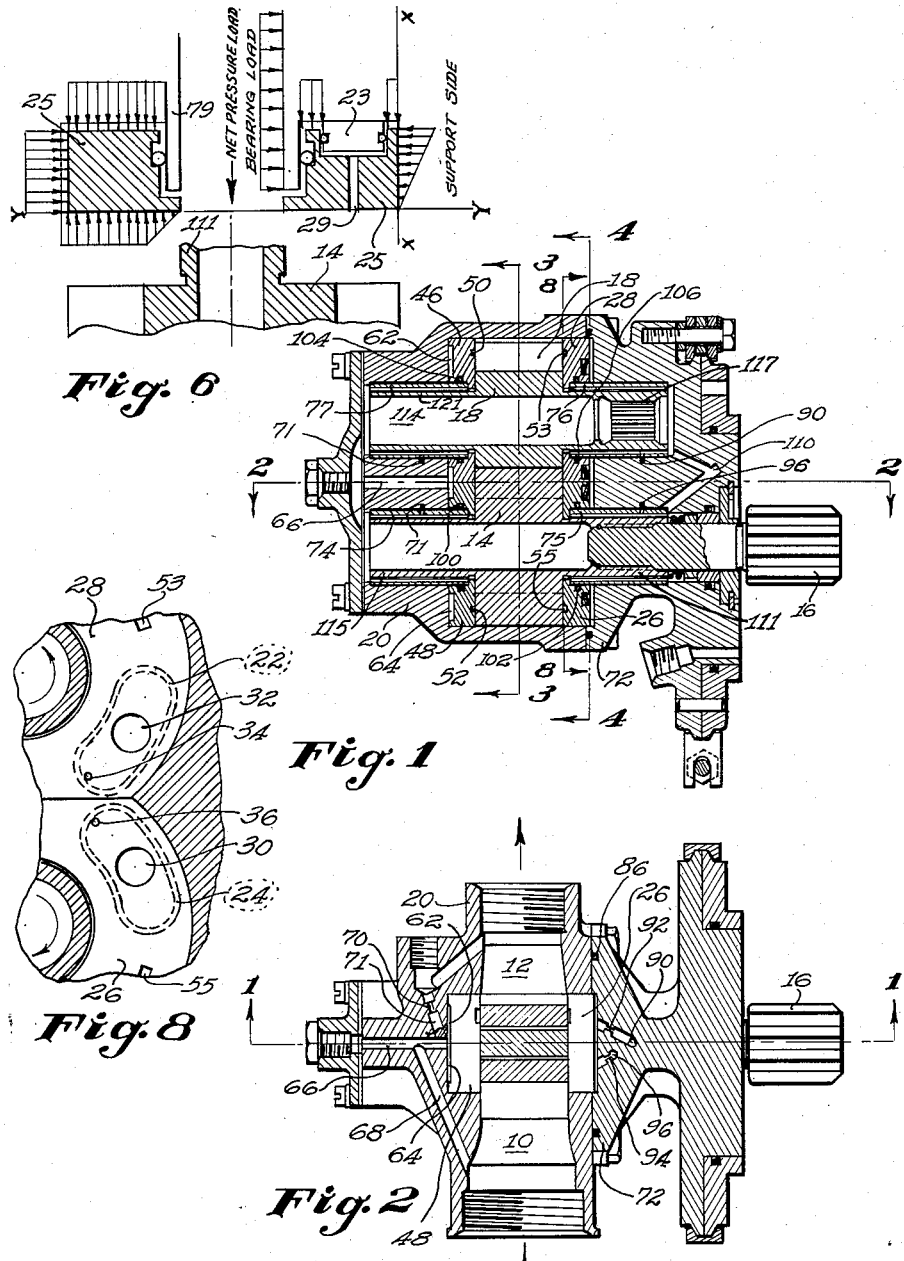
A. W. Orr Jr.
INVENTOR.
BY
ATTORNEY July 6, 1954    A. W. ORR, JR    2,682,836
FUEL PUMP
Filed April 20, 1950    3 Sheets-Sheet 2
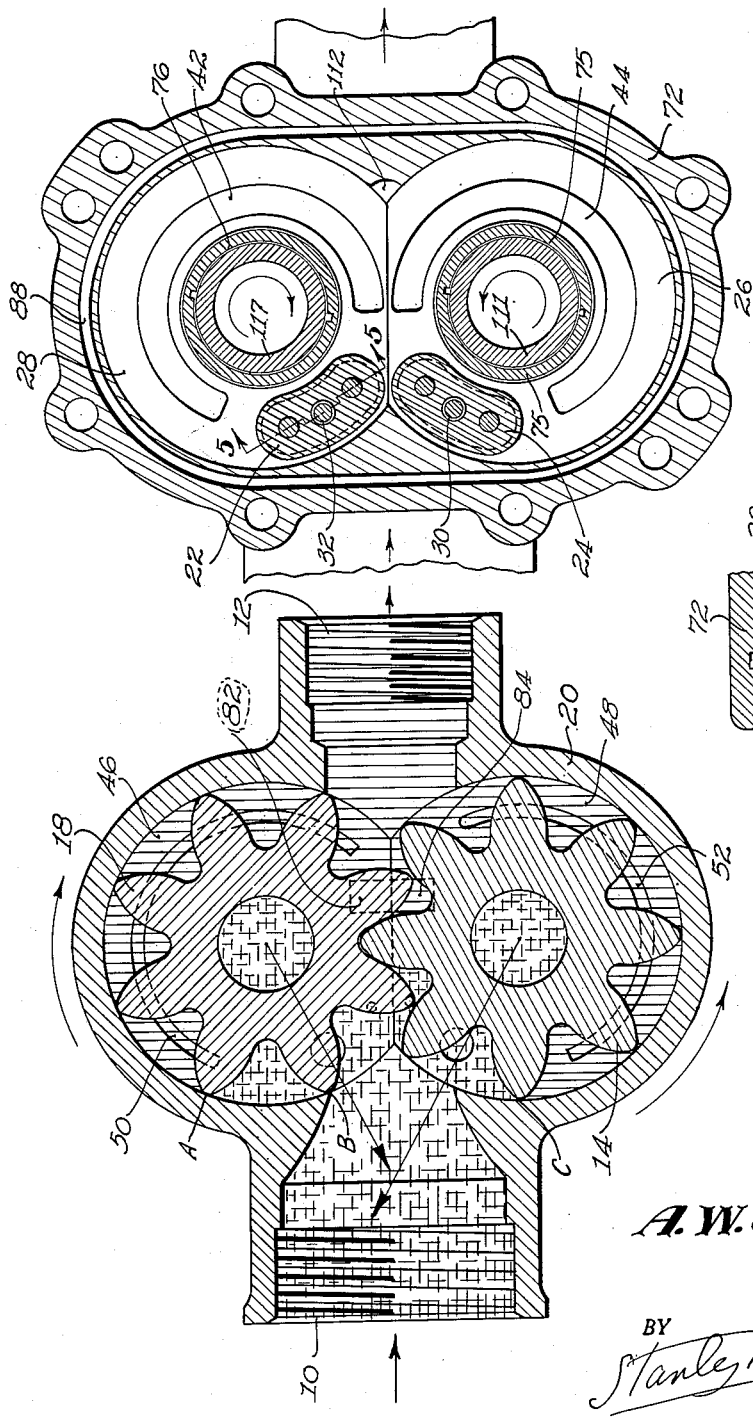
A. W. Orr Jr.
INVENTOR.
BY Stanley M. Udale
ATTORNEY July 6, 1954 A. W. ORR, JR 2,682,836
FUEL PUMP
Filed April 20, 1950 3 Sheets-Sheet 3
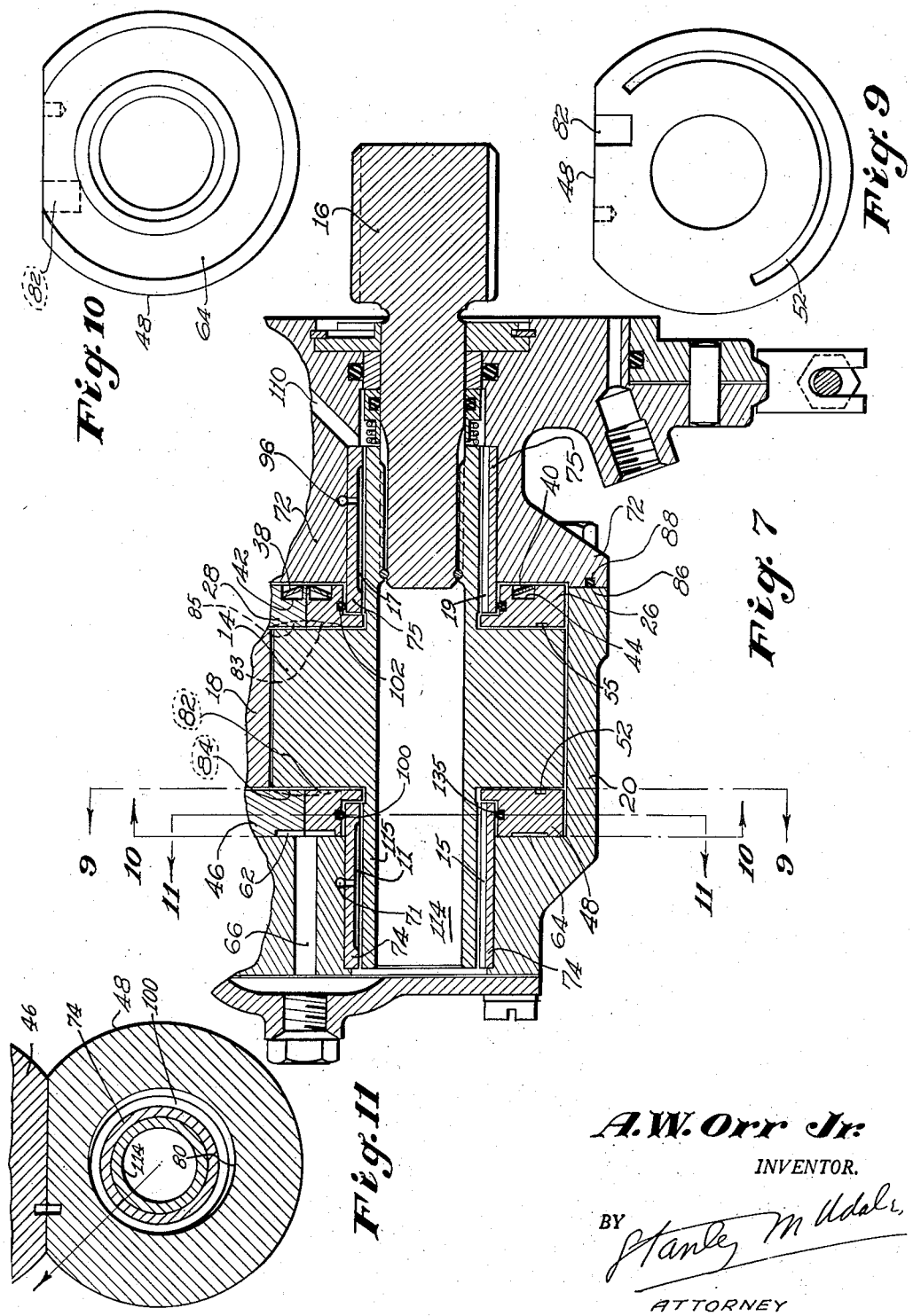
A. W. Orr Jr.
INVENTOR.
BY
ATTORNEY Patented July 6, 1954

2,682,836

UNITED STATES PATENT OFFICE 2,682,836

FUEL PUMP

Andrew William Orr, Jr., Detroit, Mich., assignor to George M. Holley and Earl Holley Application April 20, 1950, Serial No. 157,070

5 Claims. (Cl. 103—126)

The object of this invention is to improve the endurance qualities and performance of gear fuel pumps embodying axially movable discharge pressure loaded end seal plates sealing the rotating gear end faces. In the usual pump of this type a circular ring area on the non-contact face of a combined L-shaped end seal plate and gear shaft bearing is exposed to pump discharge pressure or some modification thereof to provide a force urging the end (flange) seal plate in contact with the rotating gear end face slightly in excess of that force acting from the gear on the contact face of the end seal plate; this effects a positive seal between the end seal plate and the rotating gear end face.

However, with such a construction the forces around the support area where the end seal plate rests on the gear bore are such that the end seal plate can cock, being in contact with the rotating gear end face on the inlet side of the pump only, with consequent increase in the unit load due to the pressure loading force. In the construction shown in this invention, the end seal plates contacting the rotating gear end faces are separated from the gear shaft bearing.

On the non-contact faces of two end seal plates the area is divided so that part is exposed to discharge pressure and part to inlet pressure, and the area is so proportioned that the moments and couples of the axial forces about the end seal plate support area are such as to hold all the end seal plate in contact with the rotating gear end face without cocking. The construction is such that an extremely light pump suitable for aircraft use with available fuel is obtained.

Fig. 1 is a cross-sectional plan view taken on plane 1—1 of Fig. 2.

Fig. 2 is a cross-sectional elevation taken on plane 2—2 of Fig. 1.

Fig. 3 is a cross-sectional elevation taken on plane 3—3 of Fig. 1.

Fig. 4 is a cross-sectional elevation taken on plane 4—4 of Fig. 1.

Fig. 5 is a cross-sectional elevation taken on plane 5—5 of Fig. 4.

Fig. 6 is a diagrammatic illustration of the distribution of pressure on the end inboard plate which seals the pump.

Fig. 7 is an enlarged detail from Fig. 1.

Fig. 8 is an elevation taken on plane 8—8 of Figs. 1 and 5.

Fig. 9 shows an end view of one of the outboard end seal plates as viewed on plane 9—9 of Fig. 7.

Fig. 10 shows an end view of one of the outboard end seal plates as viewed on plane 10—10 of Fig. 7.

Fig. 11 shows a cross-sectional elevation of one of the outboard end seal plates taken on plane 11—11 of Fig. 7. This figure is somewhat distorted.

In the figures 10 is the low pressure fuel inlet (see Fig. 3). 12 is the high pressure fuel outlet. The driving gear 14, with integral support shafts, is driven by the splined shaft 16. 18 is the driven gear also with integral support shafts. 20 is the outboard pump housing provided with two overlapping cylindrical cavities into which fit the two gears 14 and 18 and the end plates 26, 28, 46 and 48. 72 is the inboard pump housing into which the inboard shaft from the gears 14 and 18 extend. This has two shallower overlapping cylindrical cavities of the same diameter as those in outboard pump 20 to provide means for dowelling the casing 20 to the casing 72. O section seal 86, in groove 88 (Fig. 4), prevents liquid from escaping between the faces of casings 20 and 72 when they are bolted together.

Four bearings 74, 75, 76 and 77 are fixed in the outboard and inboard pump housings 20 and 72 to receive the supporting shafts of the gears. These bearings are separated from the four end seal plates 26, 28, 46 and 48. The separation of the movable end seal plates from the fixed bearings is an important part of the invention. Outboard and inboard housings 20 and 72 are dowelled together so that the bores receiving bearings 74, 75, 76 and 77 may be line bored after which bearings 74, 75, 76 and 77 are shrunk or pressed into place with an interference fit of approximately 0.001 inch per inch of bearing outside diameter. The bearings 74, 75, 76 and 77 are provided with lubrication slots 11, 15, 17, 19 (Fig. 7) in a conventional manner. Metered high pressure fluid is transferred to the lubrication slots in bearings 74 and 77 by means of lines 71 and restrictions 70. Line 90 and restriction 92; and line 96 and restriction 94 furnish metered high pressure fluid to the lubrication slots in bearings 75 and 76.

The sealing plates 26, 28 and 46, 48 are circular in shape but each has a segment removed therefrom so that the chordal surface remaining on plate 26 will match that of plate 28 while that remaining on plate 46 will match that on plate 48. The plates are then mounted in pairs so that the chordal surfaces of adjacent plates abut one another.

In order to subject the inboard end seal plates 26—28 to the high pressure a passage 112 (Fig.

4) is provided in the inboard casing 72. Through this passage high pressure is transmitted to the right hand side of the two inboard end seal plates 26—28 (Fig. 7). Low pressure is transmitted to the left hand side of the two outboard end plates 46—48 through the inclined passage 68 (Fig. 2), the central passage 66, through the opening 114 (Fig. 1) inside the gear 18. Low pressure is also transmitted to the inboard bearings 75 and 76 through the inclined passage 110 (Figs. 1 and 7) which passage is connected to the passage 114. In Fig. 3 the broken square cross-hatching indicates low inlet pressure. The vertical lines represent the high pressure in the fuel outlet.

On the outboard end of the two overlapping cylindrical bores in the outboard housing 20 are the two outboard end seal plates having exactly the same thickness 46 and 48. A narrow groove 52 (Figs. 3, 7 and 9) is located on the face of end seal plate 48 contacting the rotating end face of gear 14. A similar groove 50 is located on the similar face of end seal plate 46. These grooves extend from the outlet side of the pump around to within some whole multiple (usually one) of the angular tooth spacing from the pump inlet to establish definite areas of high and low pressure around the faces of the end seal plates 46 and 48 in contact with the gears as shown in Fig. 3. Similar grooves 53 and 55 in the end seal plates 26 and 28 are provided for similar purposes. The non-gear contact faces of end seal plates 46 and 48 have wider grooves 62 and 64 which are vented to inlet pressure through passages 66 and 68. Pressure relief ports 82 and 84 are provided on the faces of end seal plates 46 and 48 in contact with the gear end faces of 18 and 14 to allow the escape of fluid and prevent a pressure building up in the gear tooth intermesh region where the trapped fluid volume changes from a minimum to a maximum. These ports are located so that they are just being closed as the fluid trapped between the meshing gear teeth reaches a minimum volume. Similar pressure relief ports 82 and 84 are at similar locations on end seal plates 26 and 28 for the same purpose.

The distribution of pressure on the non-gear contact faces of end seal plates 26 and 28 is controlled by the kidney shaped elements 22 and 24 mounted on the inboard housing 72 (Fig. 5) on the inlet side of the pump which fits in corresponding depressions in the non-gear contact faces of end seal plates 26 and 28. In order to isolate the low pressure an O ring 21 is provided.

This is one of the important subjects of the invention and it is understood that the kidney shaped elements 22 and 24, shown bolted to the inboard housing 72, could equally well be mounted on the outboard housing 20 where they would occupy positions corresponding to positions in which they are shown.

In Fig. 6 the element 23 (not cross-sectioned) corresponds to the elements 22 and 24 (Figs. 4 and 5). The element 25 corresponds to elements 26 and 28. The parts have been exploded so that the pressure distribution can be illustrated. Fig. 6 is thus a schematic representation of the distribution of the pressures acting on the end seal plates 26 and 28. The thickness of the end plate 25 has been increased so as to allow space for indicating pressure changes. Fig. 6 does not dimensionally conform with Fig. 5.

In Fig. 6 an opening 29 transmits a low pressure balancing pressure on the inside of a portion of the end plate 25, that is, over an area represented by the kidney shaped element 23. The two openings 30 and 32 in Figs. 5 and 8 correspond to the opening 29. Two small openings 34 and 36 are shown in Figs. 5 and 8. Either 32 or 34 is at all times exposed to the low pressure in the fuel inlet 10. Two springs 38 and 40 of Fig. 7 provide the necessary initial end thrust loading when the pump is first assembled. These two springs rest in the two annular grooves 42 and 44 (Figs. 4 and 7) provided to accommodate the two springs 38 and 40 (Fig. 7).

In Figs. 9, 10 and 11 the outboard seal 48 is shown with an eccentric bore 80 which is the bottom of a groove 135 located eccentrically with relation to the outer diameter of the end sealing plate 48 and the bearing 74. This eccentricity causes the O ring 100 which is seated in the groove to be compressed on one side of the bearing 74 and to thereby transmit a thrust to the end plate at the point of such compression. Diametrically opposite this point of compression the O ring serves primarily a sealing function and is stressed to a much smaller extent than at the aforementioned point of compression so that the net force on the end plate is in the direction indicated by the arrow in Fig. 11. The eccentricity may be so placed as to direct the force in the direction shown by the arrow in Fig. 11. This thrust on each end plate forces their chordal surfaces together and forces their peripheries against the housing near the entrance or inlet to the pump so as to bring about a sealing action tending to eliminate any leakage around these surfaces. The O rings 100 and 102 thus fit into the groove eccentrically provided in the plates 26 and 48. Similar eccentric grooves for similar O rings are provided in plates 28 and 46.

For one configuration the outside diameter of the nitralloy gears 14 and 18 is 1.9995. The inside diameters of the aluminum housing 20 are 2.0005. The outside diameter of the gear shafts is .748 inch and the inside diameter of the copper lead bearings 74, 75, 76 and 77 is .750 inch. The outside diameter of the copper lead end seal plates is 1.999 inches. These dimensions give clearances such that when the gear shafts move in their appropriate bearings toward the inlet side of the pump, the tips of the gear tooth contacts the cylindrical bores in housing 20 on the pump inlet side and wear into the bore to effect a seal. This gives a rough idea of the clearances tolerated if gasoline is to be pumped at 400 to 700 pounds per square inch without inside lubrication. The Hertzian specific compressive stress on the gear teeth is held down to 100,000 pounds per square inch and a gasoline temperature rise from 65° F. to 100° F. is the maximum tolerated.

Operation

Before the pump is started, the pumping elements are in definite positions. Springs 38 and 40 (Figs. 1 and 7) urge end seal plates 26 and 28 into contact with the inboard end faces of gears 14 and 18. The outboard end faces of gears 14 and 18 are urged into contact with the inboard faces of end seal plates 46 and 48 which urges the non-gear contact or outboard faces of end seal plates 46 and 48 into sealing contact with the outboard vertical faces of the overlapping cylindrical bores in outboard pump housing 20. The eccentrically cut grooves for O ring seals 100, 102, 104 and 106 position the end seal plate combination 46 and 48 and the end seal plate combination 26 and 28 so that they are urged toward each other and toward the inlet side of the pump. These measures effect a preliminary seal for fluid leakage from high to low pressure at all points except across the gear tooth tips. The arrow in Fig. 11 shows how the eccentric groove 80 (somewhat distorted) throws the element 48 in a northwest direction along the line of the arrow. The element 46 is thrown in a southwest direction by similar means and, as a result, these two elements are pressed together and both of them as a unit are forced to the left (west) which is towards the inlet side of the pump.

Immediately after the pump starts, pressure built up in the exit 12 and the leakage across the gear end face back to entrance 10 is reduced by the end pressure of the inboard seal plates 26 and 28 against the sides of the two gears 14 and 18. This pressure is transmitted against the two outboard seal plates 46 and 48. The left side of outboard end plates 46 and 48 (Fig. 7) is maintained at the low pressure in the fuel entrance 10 as shown by the broken square cross-hatching (Fig. 3) which holds these against the vertical face of outboard housing 20.

A certain area to the left of the gears is at this low inlet pressure. To create a desirable balance and to avoid a most undesirable tendency to tip over and to cause uneven wear the two kidney shaped elements 22 and 24 are bolted to the inboard casing 72 and fitted into the end plates 26 and 28. The openings 32 and 34 in the inboard end plate 28 (Figs. 4 and 5) transfers low pressure to the face of the element 22. Element 24 is made as an exact counterpart of element 22 shown in Fig. 5 and the part 26 is an exact counterpart of element 28 (Fig. 4).

The remainder of the areas of the four end plates 26, 28, 46 and 48 are subjected on their inner faces to the high pressure generated by the gear teeth displacing liquid. Four narrow grooves 50, 52, 53 and 55 (Figs. 3 and 8) equalize this pressure over the faces of the end plates.

Fig. 3 also shows the hydraulic loads imposed upon the gears. When these are combined with the gear tooth loads the net load on the gears 14 and 18 is such as to force them toward each other and toward the inlet side of the pump. Thus the driving gear 14 as well as the driven gear 18 is forced under pressure into engagement with the housing 20 at the points A, B and C (Fig. 3). The two arrows illustrate the resultant pressure. This effects a close seal between the gear tooth tips and the housing 20 and minimizes leakage.

In Fig. 6 the element 23 corresponds to one of the two kidney shaped elements 22 and 24. The distribution of pressure is shown diagrammatically and the passage 29 equalizes the low pressure on the face of element 25 (which corresponds to element 28 of Fig. 5).

The net effect of the construction shown is to give a slight loading force at all discharge pressures holding the end seal plates 26 and 28 in contact with gears 14 and 18 and gears 14 and 18 in contact with end seal plates 46 and 48 to minimize leakage and provide takeup for wear on these parts. The kidney shaped elements 22 and 24, together with the matching depressions in end seal plates 26 and 28, make possible the disposition of the axial loading force acting on end seal plates 26 and 28 in such a manner that full contact is secured between the outboard faces of end seal plates 26 and 28 and the corresponding rotating end faces of gears 14 and 18.

What I claim is:

1. In a pump having a pair of intermeshing gears, a housing for such gears, an inlet and an outlet, two supporting shafts for each gear and four bearings for said shafts projecting into the walls of said housing; a sealing means comprising, four end plates arranged between the side faces of the gears and the walls of the housing, said end plates being recessed to receive the projecting ends of said bearings, a circular surface in each of said recesses eccentric of the centers of said bearings and communicating with said recesses, and means between and in contact with said surfaces and said bearings supporting said end plates on said bearings, said means being compressed between said surfaces and said bearings to a greater extent on one side thereof than on the diametrically opposite side so as to force adjacent end plates together and to force their outer edges eccentrically into contact with the walls of the housing proximate the pump inlet.

2. In a pump having a pair of intermeshing gears, a housing for such gears, an inlet and an outlet, two supporting shafts for each gear and four bearings for said shafts projecting into the walls of said housing; a sealing means comprising, four end plates arranged between the side faces of the gears and the walls of the housing, said end plates being recessed to receive the projecting ends of said bearings, each of said recesses including a circular surface located eccentric of the centers of said bearings, and means between and in contact with said surfaces and said bearings supporting said end plates on said bearings, said means being compressed between said surfaces and said bearings to a greater extent on one side thereof than on the diametrically opposite side so as to force adjacent end plates together and to force their outer edges eccentrically into contact with the walls of the housing proximate the pump inlet.

3. In a pump having a pair of intermeshing gears, a housing for such gears, an inlet and an outlet, two supporting shafts for each gear and four bearings for said shafts projecting into the walls of said housing; a sealing means comprising, four end plates arranged between the side faces of the gears and the walls of the housing, said end plates being recessed to receive the projecting ends of said bearings, each of said recesses including a circular surface located eccentric of the centers of said bearings, and an O ring interposed between each of said eccentric surfaces and said bearings, said O rings being compressed between said surfaces and said bearings to a greater extent on one side thereof than on the diametrically opposite side so as to force adjacent end plates together and to force their outer edges into contact with the walls of the housing proximate the inlet of the pump.

4. In a meshing gear type pump including a housing having an inlet and an outlet, a driving gear and a driven gear, a pair of supporting shafts for each gear, and a bearing for each of said shafts projecting into the housing; a sealing means comprising, a pair of circular sealing end plates for each gear, located between the side faces of the gears and the walls of the housing, said circular end plates each having a segment removed therefrom and being so mounted that chordal surfaces of adjacent end plates abut one another, the diameter of said end plates being substantially equal to the inner diameter of the housing and substantially equal to the diameter of said gears, said end plates being recessed to receive the projecting portions of said bearings, each of said recesses including a circular surface located eccentric of the centers of said bearings, an O ring interposed between each of such eccentric surfaces and the respective bearings, said O rings being compressed between said surfaces and said bearings to a greater extent on one side thereof than on the diametrically opposite side so as to force adjacent end plates together and to force their outer edges into contact with the walls of the housing proximate the inlet of the pump.

5. In a pump having a pair of intermeshing gears, a housing for such gears, an inlet and an outlet, two supporting shafts for each gear and four bearings for said shafts projecting into the walls of said housing; a sealing means comprising, four end plates arranged between the side faces of the gears and the walls of the housing, said end plates being recessed to receive the projecting ends of said bearings, each of said recesses including a circular surface located eccentric of the centers of said bearings, means between and in contact with said eccentric surfaces and said bearings supporting said end plates and forcing adjacent end plates together and forcing their outer edges eccentrically into contact with the walls of the housing proximate the pump inlet, each of said plates having on the gear facing surface thereof an arcuate groove extending from a point near and in communication with the outlet of said pump to a point short of the inlet to equalize the pressure in all spaces in communication with said groove, said shafts being mounted in said bearings with sufficient clearance therebetween to permit the gears to barely touch the walls of the housing proximate the inlet in response to the outlet pressure transmitted over a large percentage of said gear surfaces by means of the equalizing grooves, said gears being urged together and toward said inlet.

References Cited in the file of this patent

UNITED STATES PATENTS

| Number | Name | Date |
|---|---|---|
| 1,441,375 | Rolaff | Jan. 9, 1923 |
| 1,470,030 | Rolaff | Oct. 9, 1923 |
| 1,780,109 | Bergglund | Oct. 28, 1930 |
| 1,972,632 | Patton | Sept. 4, 1934 |
| 2,044,873 | Beust | June 23, 1936 |
| 2,147,777 | Oshei | Feb. 21, 1939 |
| 2,211,154 | Oshei | Aug. 13, 1940 |
| 2,312,891 | Ferris | Mar. 2, 1943 |
| 2,405,061 | Shaw | July 30, 1946 |
| 2,420,622 | Roth et al. | May 13, 1947 |
| 2,472,031 | Wichorek | May 31, 1949 |
| 2,487,732 | Schanzlin | Nov. 8, 1949 |
| 2,527,941 | Lauck et al. | Oct. 31, 1950 |
| 2,624,287 | Ilyin | Jan. 6, 1953 |